S. A. APPELL.
COMBINED CIGARETTE OR LIKE CASE AND ELECTRIC TORCH.
APPLICATION FILED FEB. 25, 1920.
1,397,610.
Patented Nov. 22, 1921.
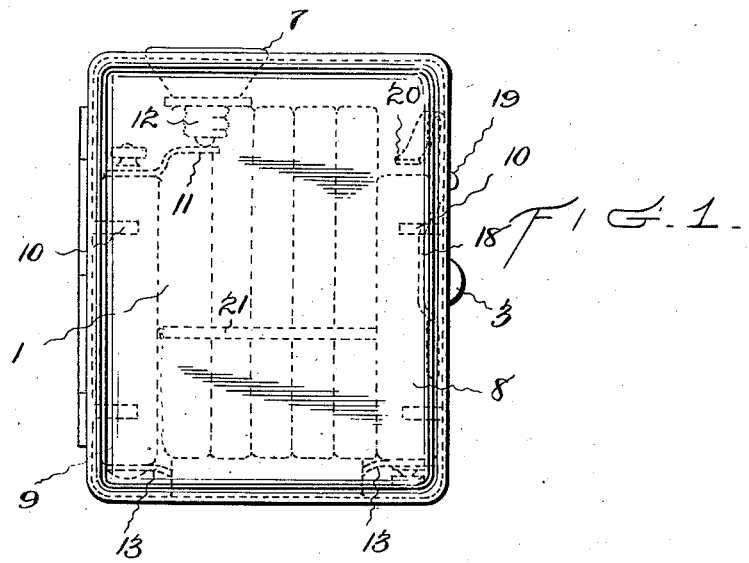
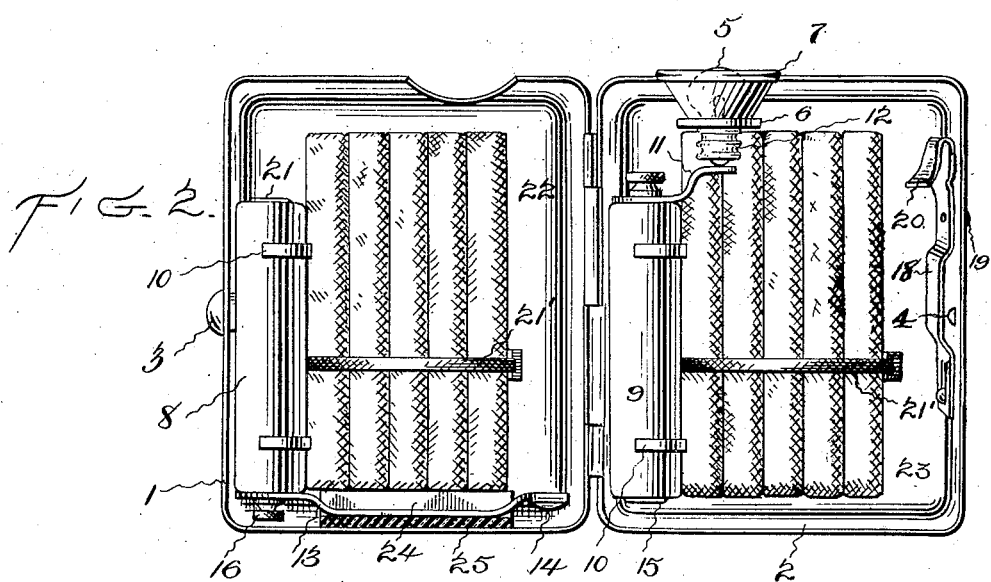
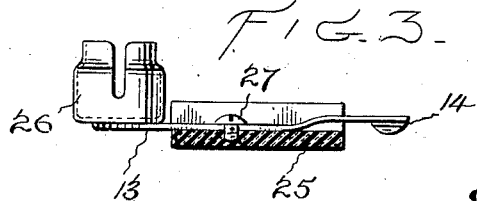

UNITED STATES PATENT OFFICE.

SAMUEL A. APPELL, OF NEW HAVEN, CONNECTICUT.

COMBINED CIGARETTE OR LIKE CASE AND ELECTRIC TORCH.

1,397,610.   Specification of Letters Patent.   Patented Nov. 22, 1921.

Application filed February 25, 1920. Serial No. 361,146.

*To all whom it may concern:*

Be it known that SAMUEL A. APPELL, a citizen of the United States, and resident of New Haven, in the county of New Haven and State of Connecticut, have invented a certain new and useful Improvement in a Combined Cigarette or like Case and Electric Torch, of which the following is a specification.

The present invention relates to cigar, cigarette and like pocket cases, and the chief object of the invention, among other things, is to combine with the case, an electric flashlight or torch, in such a manner that the bulk or weight of the combined article, will not be materially increased, nor will the carrying capacity of the case, be materially lessened.

According to this invention, instead of employing one large battery cell, which will give the required current to illuminate a serviceable lamp, but which cell would unduly increase the size of the combined article, a pair of smaller battery cells are employed, and these cells are contained one in each section of the case, together with the lamp, switch, contactors and connections, one of the latter being broken when the sections of the case are in the open position.

The invention will be more fully described hereinafter with reference to the accompanying drawings, wherein—

Figure 1 is an elevation representing the case as closed, but showing in dotted lines, the parts contained therein;

Fig. 2 is an elevation representing the case as having the two sections thereof in an open position, and, Fig. 3 illustrates a modified construction of the connection between the two battery cells.

In the said drawing, the case is composed of the two sections 1 and 2, hinged together and having spring clasp 3 engaging catch 4 thus holding the two sections together when in their closed position. An electric lamp 5 is held by a bracket 6 which is fixed within the section 2 and a suitable guard and reflector for the lamp is also secured to said bracket. Battery cells 8 and 9 are respectively contained in sections 1 and 2 and said cells are firmly held in place by spring clips 10 secured on the inside of said sections. The connection 11, between the lamp base 12 and one terminal of battery 9 is permanent, whereas the connection 13, between the other terminal of battery 9 and one terminal of battery 8, is broken when the two sections of the case are open. But, when said sections are closed, contact 14, under spring tension, is brought into contact with terminal 15 of battery cell 9; said contact 14 being inclined on one edge so as to readily pass onto and engage terminal 15. The connection 13, it will be noted, is permanently connected to terminal 16 of battery cell 8.

When the case is closed, the two battery cells are properly connected together, and then, by operation of the sliding switch 18, through manipulation of external button 19, movable contact 20 is brought into contact with terminal 21 of battery 8, thus completing the electric circuit which effects illumination of the lamp 5.

The cigarettes or other contents of the case, are kept together by suitable means, such as an elastic band 21', so as to keep the spaces 22 and 23 clear, for said spaces must receive respectively the battery cells 8 and 9, when the case is closed.

The connection 13 is comparatively long and must therefore be supported so that it cannot come into contact with the wall of the case, to cause a short circuit. The contactor 14, with the connection 13, is mainly for the aforesaid reason, held in the groove 24 of the block 25, and which latter block is composed of insulating material and is secured within the section 1.

In order to facilitate removal and renewal of the battery cells, and to permit cells of a standard pattern to be used, the connection 13, and likewise the connection 11 if desired, may be provided with a spring clip shell 26, fitting over the end of the battery cell. When such a device is employed, the connection 13 may with preference, be anchored to the insulating block by means of screw 27.

The advantages and utility of the invention hereinbefore described are apparent in that without materially increasing the size and weight of a cigarette case, as illustrated, and without materially decreasing the carrying capacity thereof, two serviceable pocket articles are condensed and combined into one article, thus giving the best convenience and also reducing the cost of production and diminishing the space occupied in the pocket, as compared with the two articles separate from each other.

I claim—

1. A combined cigarette or like case and electric torch having a pair of hinged sections; a battery cell secured in each section on opposite sides thereof, when in a closed position; an electric lamp secured in one section; a fixed connection between said lamp and the cell secured in the same section; another connection between said battery cells, which latter connection is made and broken respectively when said sections are in the closed and open positions; and a switch for making and breaking an electric circuit from said battery cells to said lamp.

2. A cigarette or like case as described having sections capable of being opened and closed, an electric battery unit contained in each section and located therein in positions relatively to each other so as to leave a clear space therebetween when the case is closed, means for establishing an electric circuit between said battery units, a lamp in said circuit and a switch for opening and closing the circuit to said lamp.

3. A cigarette or like case as described having sections capable of being opened and closed, an electric battery unit contained in each section and located therein in positions relatively to each other so as to leave a clear space therebetween when the case is closed, means for establishing an electric circuit between said battery units and said means comprising a spring holding clip for one battery unit having a contactor which engages the other battery unit when the case is closed, a lamp in said circuit and a switch for opening and closing the circuit to said lamp.

Signed at New Haven, in the county of New Haven and State of Connecticut, this 21st day of February, A. D. 1920.

SAMUEL A. APPELL.